United States Patent [19]

Horio et al.

[11] Patent Number: 4,742,411
[45] Date of Patent: May 3, 1988

[54] MAGNETIC HEAD FEED MECHANISM INCLUDING A DUST PREVENTING MEANS

[75] Inventors: Motohiko Horio; Naoki Kobayashi; Fujio Okada; Kouji Kaneko, all of Ohmiya, Japan

[73] Assignee: Fuji Photo Optical Co., Ltd., Saitama, Japan

[21] Appl. No.: 857,098

[22] Filed: Apr. 29, 1986

[30] Foreign Application Priority Data

May 1, 1985 [JP] Japan .................... 60-65633[U]

[51] Int. Cl.⁴ .................... G11B 5/55; G11B 21/08
[52] U.S. Cl. .................... 360/106; 360/90
[58] Field of Search .................... 360/97-99, 360/133, 137, 104-106; 277/80; 389/478; 403/362; 310/90

[56] References Cited

U.S. PATENT DOCUMENTS

| | | | |
|---|---|---|---|
| 3,593,332 | 7/1971 | Strehl | 360/97 |
| 4,410,922 | 10/1983 | Babow et al. | 360/104 |
| 4,531,846 | 7/1985 | Raj | 360/98 |
| 4,649,306 | 3/1987 | Yamashita | 360/90 |

Primary Examiner—John H. Wolff
Assistant Examiner—Alfonso Garcia
Attorney, Agent, or Firm—Gerald J. Ferguson, Jr.; Michael P. Hoffman; Michael J. Foycik, Jr.

[57] ABSTRACT

A magnetic head feed device for feeding a magnetic head for recording information on a magnetic recording disk and/or reproducing information from the magnetic recording disk in a radial direction of the magnetic recording disk includes a driving force source which outputs a driving force for feeding the magnetic head as a rotational motion thereof, a rotational motion-linear motion converting mechanism for converting the rotational motion of the driving force source into a linear motion of the magnetic head. The rotational motion-linear motion converting mechanism includes a spur gear to be rotated upon rotation of the driving force source, a shaft portion which is coaxially connected to the spur gear to be rotated together therewith and is provided with an enlarged diameter portion having a male thread portion formed on the outer surface thereof, a female screw unit having an elongated passage through which the shaft portion extends and which is longer than the enlarged diameter portion of the shaft portion, the female screw unit being fixedly mounted and provided with a female thread portion into which the male thread portion of the shaft portion is screwed, and a pair of lid members which are mounted on the respective ends of the passage to close the passage and are provided with circular central openings through which the shaft portion extends into the passage and projects therefrom so that the enlarged diameter portion is positioned between the lid members.

3 Claims, 2 Drawing Sheets

MAGNETIC HEAD FEED MECHANISM INCLUDING A DUST PREVENTING MEANS

BACKGROUND OF THE INVENTION

1. Field of the Invention

This invention relates to a magnetic head feed device, and more particularly to a magnetic head feed device comprising a rotational motion-linear motion converting means for converting a rotational motion of a rotating motor into a linear motion of a magnetic head.

2. Description of the Prior Art

In a magnetic recording/reproducing system using a magnetic recording disk, e.g., an electronic camera, there is generally required a magnetic head feed device for feeding the magnetic head in a radial direction of the magnetic recording disk placed on a spindle.

The magnetic head feed device is generally driven by a rotating motor such as a stepping motor or a DC motor, and accordingly, there is required a rotational motion-linear motion converting means for converting a rotational motion of the motor into a linear motion of the magnetic head.

There has been known a rotational motion-linear motion converting means in the form a feed screw unit comprising a spur gear driven by a rotating motor, a shaft portion which has the spur gear integrally and coaxially therewith and is provided on a part of the outer surface with a male thread portion, and a pipe portion having a female thread portion in mesh with the male thread portion of the shaft portion so that the shaft portion is linearly moved when it is axially rotated.

Since the female thread portion of the pipe portion is generally formed from one end of the pipe portion as a matter of manufacturing convenience, an end portion of the female thread portion is exposed as the shaft portion is linearly moved and there is a possibility that dust is deposited on the exposed portion of the female thread portion. When dust is deposited on the female thread portion, accuracy in feeding the shaft portion is lowered and load on the motor is increased.

Since the other end portion of the pipe portion functions as a guide for guiding the linear motion of the shaft portion, a relief portion must be formed between the guide portion and the female thread portion. The work of forming the relief portion is very difficult especially when the diameter of the female thread portion must be small.

SUMMARY OF THE INVENTION

In view of the foregoing observations and description, the primary object of the present invention is to provide a magnetic head feed device having a rotational motion-linear motion converting means in which deposition of dust on the threaded portion can be prevented and threading work can be done easily.

In accordance with the present invention, the rotational motion-linear motion converting means comprises a spur gear to be rotated upon rotation of the rotating motor, a shaft portion which is coaxially connected to the spur gear to be rotated together therewith and is provided with an enlarged diameter portion having a male thread portion formed on the outer surface thereof, a female screw unit having an elongated passage through which the shaft portion extends and which is longer than the enlarged diameter portion of the shaft portion, the female screw unit being fixedly mounted and provided with, at least a part of the internal surface thereof, a female thread portion into which said male thread portion of the shaft portion is screwed, and a pair of lid members which are mounted on the respective ends of the passage to close the passage and are provided with circular central openings through which the shaft portion extends into the passage and projects therefrom so that the enlarged diameter portion is positioned between the lid members, the shaft portion being supported for an axial movement with respect to the female screw unit.

The lid members guides the axial movement of the shaft portion and at the same time prevents dust from entering passage of the female thread unit. In this conjunction, it is preferred that the lid members receive the shaft portion in close contact with the outer surface of the shaft portion but so as to permit sliding movement of the shaft portion with respect to the female screw unit.

In accordance with the present invention, the male and female thread portions are sealed by the lid members and dust cannot be deposited thereon. Further, since the lid members which function as a guide for guiding the axial movement of the shaft portion are produced separately from the female screw unit, the female thread portion may extend over the entire length of the passage and accordingly can be easily formed by a suitable tool such as a tap.

DESCRIPTION OF THE PREFERRED EMBODIMENT

Figure 1:
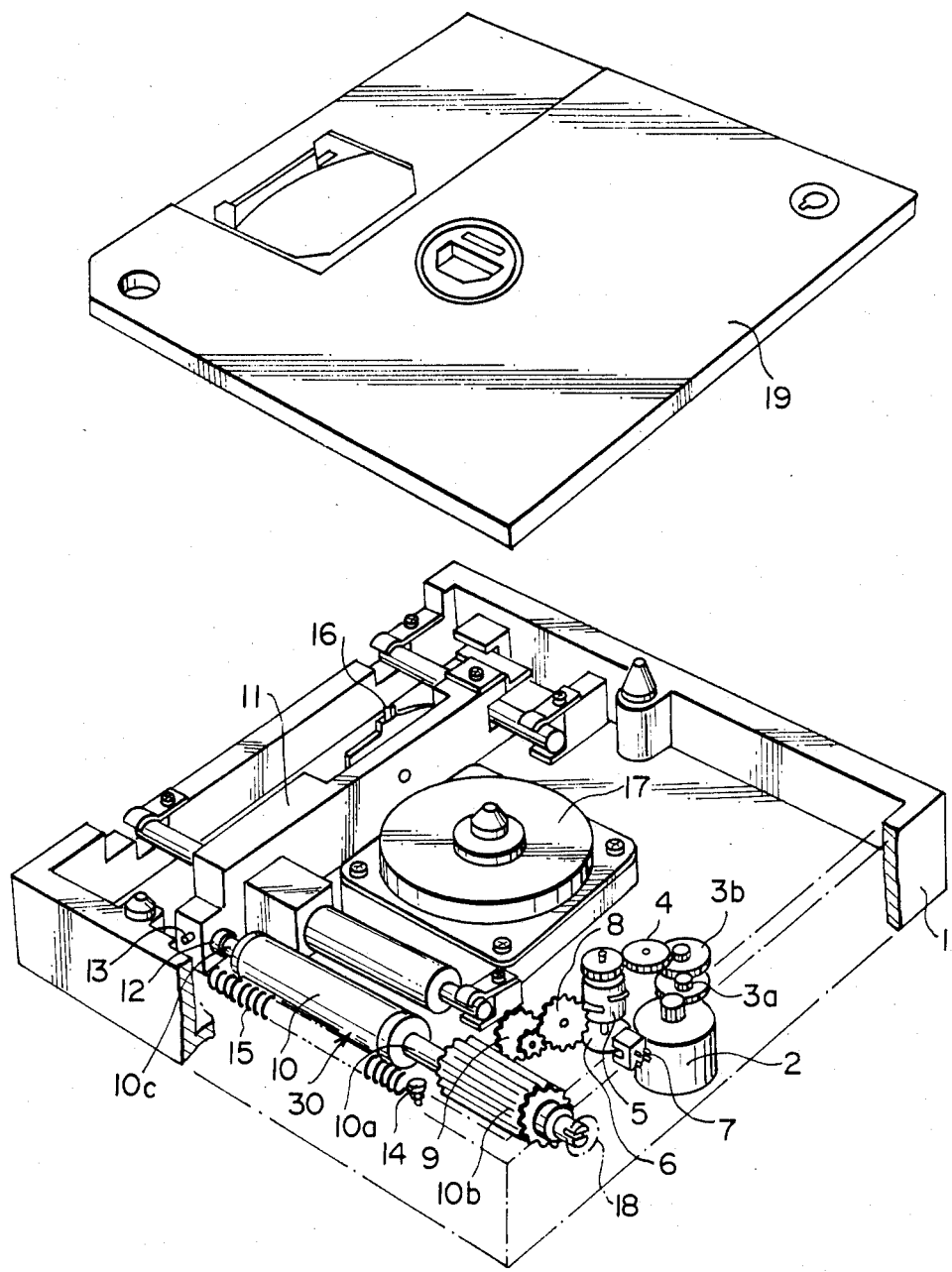
FIG. 1 is an exploded perspective view of a magnetic head feed device in accordance with an embodiment of the present invention.
Figure 2:
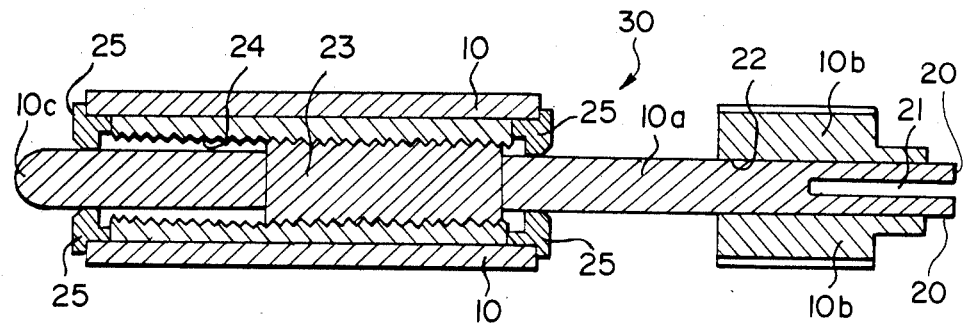
FIG. 2 is an enlarged cross-sectional view of the feed screw unit employed in the feed device of FIG. 1.

In FIG. 1, a magnetic head feed device in accordance with an embodiment of the present invention includes a casing comprising a casing body 1 and a casing lid 19. A carriage motor 2 is mounted on the casing body 1 near a side wall of the casing body 1. Idle gears 3a, 3b and 4, a worm 5 for intermittent feeding, a spur gear 8 and an increase gear 9 are disposed near the motor 2 to sequentially transmit the driving force of the motor 2 in this order. The increase gear 9 is in mesh with a spur gear 10b having a shaft portion 10a integrally therewith and rotation of the increase gear 9 is transmitted to the shaft portion 10a. A female thread unit 10 is a substantially cylindrical member fixed to the casing body 1. The female thread unit 10 is provided on the internal face thereof, with a female thread portion 24 in mesh with a male thread portion 23 as shown in FIG. 2. With this arrangement, the shaft portion 10a is moved in the axial direction thereof upon rotation of the increase gear 9. When the shaft portion 10a is moved toward a carriage plate 11, the shaft portion 10a pushes a stud pin 12 projecting from the carriage plate 11 to move the carriage plate 11 away from the center of the casing body 1. A tension spring 15 is connected to a pin 13 on the carriage plate 11 at one end and to a pin 14 on the casing body 1 at the other end, thereby urging the carriage plate 11 toward the center of the casing body 1. Accordingly, when the shaft portion 10a is moved away from the carriage plate 11, the carriage plate 11 is moved toward the center of the casing body 1 under the force of the tension spring 15. On the carriage plate 11 is mounted a magnetic head 16 to project upward from the upper end face of the carriage plate 11 to be brought into contact with a magnetic recording disk placed on a spindle 17. When the carriage plate 11 is moved by the shaft portion 10a, the magnetic head 16 is moved in a radial direction of the magnetic recording disk. On the side wall of the casing body 1 is provided an opening 18 for giving access to the shaft portion 10a to a tool such as a screwdriver for manually rotating the shaft portion 10a. A rotating disk 6 is mounted on the worm 5 integrally and coaxially therewith. A photo-interruptor 7 is disposed near the rotating disk 6 to detect a slit formed in the rotating disk 6 to detect the angular position of the worm 5. In the assembled state of the device, the casing lid 19 fixedly mounted on the casing body 1 to prevent dust from entering the casing. Thus, the spur gear 10b, the shaft portion 10a and the female screw unit 10 form a feed screw unit 30 for converting a rotational motion of the motor 2 into a linear motion of the carriage plate 11 or the magnetic head 16.

As clearly shown in FIG. 2, a slit 21 is formed in the rear end portion 20 of the shaft portion 10a. The slit 21 is widened and when the shaft portion 10a is force-fit into the central opening 22 of the spur gear 10b, the shaft portion 10a is frictionally connected to the spur gear 10b by a resilient force exerted by virtue of the widened slit 21 so that the shaft portion 10a is rotated together with the spur gear 10b.

The shaft portion 10a is provided with an enlarged diameter portion at an intermediate portion thereof, and said male thread portion 23 is formed on the enlarged diameter portion. The male thread portion 23 is screwed into the female thread portion 24 formed on the internal surface of the female thread unit 10. Since the female thread unit 10 is fixed, the shaft portion 10a is moved in the axial direction when it is rotated together with the spur gear 10b. The leading end 10c of the shaft portion 10a projects from the female screw unit 10 to push the carriage plate 11 as described above.

Figure 3:
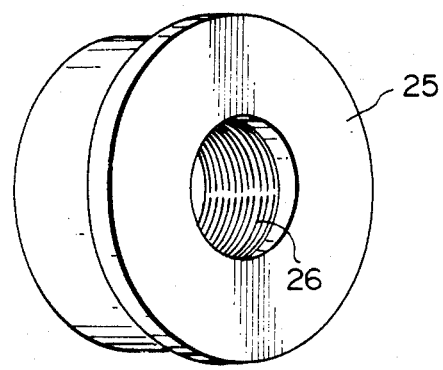
FIG. 3 is an enlarged perspective view of the lid member shown in FIG. 2.

A pair of lid members 25 are fit into the female screw unit 10 at the respective ends thereof. As shown in FIG. 3, each lid member 25 has a central opening 26 through which the shaft portion 10a extends. Thus, the shaft portion 10a is guided at the both ends of the female screw unit 10 to be smoothly moved in the axial direction thereof. Further, the lid members 25 prevent dust from entering the female screw unit 10. That is, the lid members 25 function both as a guide for guiding the axial motion of the shaft portion 10a and a seal for protecting the male thread portion 23 and the female thread portion 24 from dust. In this conjunction, it is preferred that the diameter of the central openings 26 be selected so that the lid members 25 receive the shaft portion 10a in close contact therewith but so as to permit an axial sliding movement of the shaft portion 10a.

Further, it is preferred that the lid members 25 be formed of material which is not easily worn through friction with the shaft portion 10a.

We claim:

1. A magnetic head feed device for moving a magnetic head for recording information on a magnetic recording disk and/or reproducing information from the magnetic recording disk in a radial direction of the magnetic recording disk, comprising:
    a driving force source means for producing, said driving force source means having an output as a rotational motion,
    a conversion means for converting the rotational motion of the driving force source means into a resultant linear motion of the magnetic head,
    said conversion means including a spur gear rotated by output rotation of the driving force source means, a shaft portion coaxially connected fixedly to said spur gear for rotation therewith, said spur gear having an enlarged diameter portion which has a male thread portion formed on an outer surface thereof, a female thread unit means having an elongated passage through which said enlarged diameter portion of said shaft portion extends, said elongated passage of said female thread unit means being longer that said enlarged diameter portion of said shaft portion, said female thread unit means being fixedly mounted relative to a support from the magnetic head, said female thread unit means having a thread portion which is in threaded engagement with said male thread portion of said shaft portion, said female thread unit means having a pair of lid members mounted on respective ends of said passage, each one of said pair of lid members having a circular central opening through which said shaft portion extends such that said enlarged diameter portion of said shaft portion is movably disposed between said pair of lid members such that said shaft portion is supported for movement relative to said female thread unit means.

2. A magnetic head feed device as defined in claim 1 in which said circular central opening of each one of said pair of lid members receives said shaft portion snugly with an outer surface of said shaft portion relative thereto.

3. A magnetic head feed device as defined in claim 1 or 2 in which said female thread portion extends along substantially the entire length of said elongated passage.

* * * * *